(12) United States Patent
Suchanek

(10) Patent No.: US 11,976,639 B2
(45) Date of Patent: May 7, 2024

(54) APPARATUS FOR GENERATING ELECTRICAL POWER

(71) Applicant: VGS Energy LTD, London (GB)

(72) Inventor: Martin Suchanek, London (GB)

(73) Assignee: VGS Energy LTD (GB)

( * ) Notice: Subject to any disclaimer, the term of this patent is extended or adjusted under 35 U.S.C. 154(b) by 0 days.

(21) Appl. No.: 18/265,158

(22) PCT Filed: Dec. 4, 2020

(86) PCT No.: PCT/EP2020/084766
§ 371 (c)(1),
(2) Date: Jun. 2, 2023

(87) PCT Pub. No.: WO2022/117216
PCT Pub. Date: Jun. 9, 2022

(65) Prior Publication Data
US 2023/0400013 A1    Dec. 14, 2023

(51) Int. Cl.
*F03G 3/00* (2006.01)
*H02K 7/18* (2006.01)
(52) U.S. Cl.
CPC ........... *F03G 3/094* (2021.08); *H02K 7/1815* (2013.01)
(58) Field of Classification Search
CPC ................................................... H02K 7/1815
See application file for complete search history.

(56) References Cited

U.S. PATENT DOCUMENTS

| 10,495,071 | B1 | 12/2019 | Jenkins |
| 2009/0051169 | A1 | 2/2009 | Kostoff |
| 2019/0186592 | A1* | 6/2019 | Broughton ............ F02B 63/042 |

FOREIGN PATENT DOCUMENTS

KR    200428592 Y1    10/2006

OTHER PUBLICATIONS

International Search Report for PCT/EP2020/084766 dated Aug. 3, 2021. 3 pgs.

* cited by examiner

*Primary Examiner* — Sean Gugger
(74) *Attorney, Agent, or Firm* — Lerner David LLP

(57) ABSTRACT

An apparatus for generating electrical power, comprising: a generator for generating electrical power; a handle having a first end that is rotatably coupled to the generator, and a second end that is rotatable 360 degrees about the generator in a substantially vertical plane from a top dead centre (TDC) position, through a bottom dead centre (BDC) position, and back to the top dead centre (TDC) position; a weight that is moveable along the handle between a first position, a piston arranged to move the weight between first and second positions. The piston being operable to move the weight along the handle from the first position to the second position, such that the weight provides a mechanical advantage as the handle rotates from TDC to BDC due to gravity acting on it, whereby rotation of the handle drives the generator thereby to generate electrical power. A corresponding method is also provided.

17 Claims, 16 Drawing Sheets

APPARATUS FOR GENERATING ELECTRICAL POWER

CROSS-REFERENCE TO RELATED APPLICATIONS

The present application is a national phase entry under 35 U.S.C. § 371 of International Application No. PCT/EP2020/084766, filed on Dec. 4, 2020, published in English, the disclosure of which is incorporated herein by reference.

TECHNICAL FIELD

The present invention relates to an apparatus for generating electrical power. The apparatus employs a hydraulic system that utilises gravitational forces to provide a mechanical advantage when converting mechanical energy into electrical power for supplying to an electrical grid, for example.

BACKGROUND

Most power stations contain one or more generators, which are able to convert rotational motion into electric power. Generators utilise the physical principle that if a conductor moves through an external magnetic field, a current will be produced through the conductor, thereby converting kinetic energy into electrical energy.

There are many energy sources that can be harnessed for the purpose of power generation. Most power stations use heat to drive turbines which are subsequently connected to generators. The heat is often supplied through the burning of fossil fuels such as coal, oil, and natural gas, but cleaner sources are available including nuclear power or solar power.

A problem with this is that power generation methods that convert heat into electricity are constrained by thermodynamics and as such have limited efficiency. Furthermore, concerns about the effect of fossil fuels on both the local environment and also global climate are making it increasingly important to identify cleaner power generation methods.

An aim of the present invention is therefore to provide an apparatus for generating electrical power that addresses the above concerns.

SUMMARY OF THE INVENTION

Described herein is an apparatus for generating electrical power, comprising: a generator for generating electrical power; a handle having a first end rotatably coupled to the generator, and a second end rotatable 360° about the first end in a substantially vertical plane from a top dead centre (TDC) position, through a bottom dead centre (BDC) position, and back to the top dead centre (TDC) position; a weight that is moveable along the handle between a first position, in which the weight is proximal to the first end of the handle, and a second position, in which the weight is proximal to the second end of the handle; and a piston arranged to move the weight between the first and second positions during rotation of the handle; wherein the piston is arranged to move the weight along the handle between the first and second positions as the handle is rotated, such that the weight can provide a mechanical advantage during rotation of the handle from TDC to BDC due to gravity acting on it, whereby rotation of the handle drives the generator thereby to generate electrical power.

In this way, the position of the weight along the handle can be utilised for mechanical advantage. When the handle is moving downwards in the gravitational field, the weight is radially extended to the second end of the handle, i.e. away from the centre of rotation, to increase the turning force. The fall through gravity thereby providing the falling of the handle.

When the handle is moving upwards in the gravitational field, the first weight is radially contracted closer to the centre of rotation to decrease the turning force. As the mass of the handle itself may be high, by contracting the weights on the handle towards the centre of rotation the moment of inertia can be reduced thereby aiding the lifting.

As used herein, the term "handle" may also connote an "arm" or a similar, ideally rigid, member that may be (rotatably) coupled to a generator such that its rotation drives the generator thereby to facilitate the generation of electrical power (i.e. "generate electrical power"). The handle is arranged to rotate in a substantially vertical plane, preferably wherein the plane of rotation is substantially normal/perpendicular to the surface on which the apparatus rests and/or the surface of the Earth.

As used herein, the term "top dead centre" or "TDC" preferably refers to a position of the handle about its rotation when it is substantially vertical (i.e. it is normal/perpendicular to the surface of the Earth), wherein the second end of the handle is, preferably directly, above the first end of the handle (i.e. that is rotatably coupled to the generator). In terms of a circular path of 360° (i.e. 360 degrees), the substantially vertical position of TDC preferably corresponds to 0° about that path (i.e. the uppermost point of the circular path).

As used herein, the term "bottom dead centre" or "BDC" preferably refers to a position of the handle about its rotation when it is substantially vertical, wherein the second end of the handle is, preferably directly, below the first end of the handle. In terms of a circular path, BDC preferably corresponds to 180° (i.e. the lowermost point of the circular path).

As used herein, the term "rotatably coupled" preferably connotes that rotation of the first end of the handle, e.g. by rotation of the second end of the handle, drives the generator (e.g. rotates a component of the generator to which the handle is coupled). As used herein, the term "coupled" may also connote "connected" (e.g. via intermediate components) such that a direct coupling is not necessarily required.

As used herein, the term "mechanical advantage" preferably connotes the advantage gained by the use of a mechanism in transmitting force. Here, the mechanism may be considered to be the piston and moveable weight, and the mechanical advantage gained is increased moment or torque (e.g. a force that tends to cause rotation of the handle) acting on the handle during part its rotation. By moving the weight along the handle, the torque on the handle can be increased as the handle rotates from TDC to BDC, thereby utilising gravity to assist rotation of the handle downwards (e.g. a greater moment), and decreased as the handle moves from BDC to TDC, thereby reducing the load (e.g. the moment) on the handle while it is being lifted upwards against gravity. Here, as is conventional, torque is defined as force x perpendicular distance from the pivot (i.e. where the first end of the handle is coupled to the generator). The weight may be moved repeatedly along the handle between the first and second positions over multiple cycles of rotation of the handle.

In electrical power generation, and as referred to herein, a "generator" is an apparatus that converts motive power (i.e. mechanical energy) into electricity and thence electrical power for use in an external circuit (e.g. an electrical/electricity grid).

Preferably, the piston is arranged to move the weight from the first position to the second position so that the weight is in the second position when the handle is at TDC, and from the second position to the first position so that the weight is in the first position when the handle is at BDC.

Preferably, the piston is configured such that movement of the weight between the first and second position begins before the handle reaches TDC and/or BDC. The movement of the weight along the handle occurs slightly before the very top and the very bottom point of the rotation. This ensures that the weights are moved to their respective positions prior to arriving at the top and bottom of the cycle. Alternatively, in other arrangements this movement may occur when the handle is directly at the top and bottom of the cycle (i.e. TDC, and BDC), respectively.

Preferably, movement of the weight between the first and second position begins at least 1° before the handle reaches TDC and/or BDC, preferably when the handle is in a position between 1° and 45°, more preferably between 1° and 30°, and even more preferably when the handle is in a position between 1° and 15° before it reaches TDC and/or BDC. For example, movement of the weight may begin approximately 10° before the handle reaches TDC and/or BDC.

Preferably, the piston is configured such that the movement of the weight between the first and second position completes when the handle is at the TDC and/or BDC. Alternatively, the movement may have completed prior to arriving at TDC and/or BDC. In this way, the handle is in the desired position when at TDC and/or BDC when moving between the falling and lifting stages.

Preferably, the handle may comprise an elongate rigid member. Preferably, the apparatus may comprise one or more further handles such that there is a plurality of handles rotatably coupled to the generator. For example, there may be two handles, positioned one on either side of the generator (or gearbox, etc), wherein the two handles are preferably arranged to be rotated together, e.g. in a substantially symmetrical configuration such that they are both at TDC and BDC at substantially the same time.

Preferably, the apparatus may further comprise a swing arm coupled to the handle and operable to rotate the handle from BDC towards TDC, when the weight is in the first position on the handle. Advantageously, the swing arm aids in lifting the handle from BDC towards TDC, with gravity driving the handle from TDC to BDC. The movement of the weight as described above provides mechanical advantage aiding in the lifting by the swing arm.

The apparatus may further comprise a support column extending vertically from a base frame and rigidly connected thereto, wherein the swing arm is attached to an end of the support column furthest from the base. Alternatively, the support column may extend directly from the floor on which the apparatus is housed. The support column may provide the structural support for the swing arm.

Preferably, the swing arm may be pivotally mounted to the apparatus, having a first end coupled to the handle and a second end coupled to a pulley system configured to cause the swing arm to pivot about its mount whereby to rotate the handle.

The apparatus may further comprise a swing arm piston connected at a first end to the base or support column, and at a second end to the swing arm, to assist the motion of the swing arm. The swing arm piston may be a first swing arm piston connected between the support column and the first end of the swing arm, and a second swing arm connected between the base and the second end of the swing arm. The swing arm pistons aid in moving the swing arm thereby aiding in the motion of the handle. In some arrangements the first swing arm piston may be a single piston, and the second swing arm piston may be a single piston. In other arrangements they may be a plurality of swing arm pistons.

Preferably, the swing arm may be coupled to the handle via an elongate strut that engages with an elongate slot in the handle, the slot being located between the first end and the second end of the handle, wherein, when engaged with an end of the elongate slot that is located towards the second end of the handle, the elongate strut acts to rotate the handle from BDC to TDC. The slot allows motion of the handle to be smoothly coupled to motion of the swing arm.

The length of the slot may be configured to influence the motion of the swing arm. For example, the amplitude of the swing arm motion may be proportional to the length of the slot. In this way, a slot having a longer length may result in the amplitude of the motion of the swing arm to be increased compared to a slot having a smaller length, and vice versa.

The force transmitted through the rod to and from the handle may be different depending on the location of the strut in the slot. In some arrangements there may be a single elongate strut and corresponding slot. In other arrangements there may be a plurality of elongate struts and slots.

The swing arm may be configured to tilt between a first position, when the handle is at BDC and a second position, when the handle is at TDC. The swing arm may tilt such that when in the first position the second end is raised and the first end is lowered, and when in the second position the first end is raised and the second end is lowered.

Preferably, the weight that is movable along the handle is a first weight and the apparatus may further comprise a second weight that is moveable to assist the tilt of the swing arm between its first and second positions.

The second weight may be provided on a tiltable platform, said platform having a first end located towards the first end of the swing arm, and a second end located towards the second end of the swing arm, the platform being pivotally mounted to the apparatus at a pivot point positioned between the first end and second end of the platform, wherein said second weight is moveable along the platform between the first end and second end of the platform, wherein movement of the second weight past the pivot point causes the platform to tilt downward in the direction of said movement, said platform being coupled to the swing arm such that tilting movement of the platform assists tilting movement of the swing arm.

Preferably, the second weight may be arranged to be moved to the raised first end of the platform just before the handle reaches the top of its rotation (i.e. TDC), and moved to the raised second end of the platform just before the handle reaches the bottom of its rotation (i.e. BDC).

The movement of the second weight and the first weight may occur at substantially the same time. Preferably, just before the handle reaches TDC and BDC. The movement of the first and/or second weights may occur prior to the handle reaching TDC and BDC in its cycle, as outlined above.

In some arrangements, when the swing arm raises its first end, the counterweight arm may also raise its first end. Similarly, when the swing arm raises its second end, the counterweight arm may also raise its second end. In this way the platform and swing arm may move in unison.

The second weight may be housed on a carrier located on the platform, the carrier configured to move along the platform. The second weight may be removable from the platform. This enables weights of varying sizes to be used dependent on the power output required. In other arrangements the second weight may be located directly on the platform rather than being on a carrier.

In some arrangements, the tiltable platform may be attached to the support column between the swing arm and the base. Preferably, the platform may be attached to the support column at a point midway between the swing arm and the base. Through having the platform at a position lower than the swing arm, this is particularly advantageous when loading and unloading weights from the platform. This is because the weights do not have to be raised to such a high height when unloading and loading onto the platform compared to if they were located at the height of the swing arm.

Preferably, the platform may be suspended from the swing arm by one or more cables. For instance, the platform may be suspended from the swing arm by a first cable attached between the first end of the platform and the first end of the swing arm, and a second cable attached between the second end of the platform and the second end of the swing arm.

Advantageously, this ensures that the swing arm and the counterweight platform can move in unison, and helps ensure that their movement does not get out of sync with each other. In some arrangements the first cable may be a single cable. The second cable may also be a single cable. In other arrangements the first cable may be a plurality of cables, and/or the second cable may be a plurality of cables. The cables may be made of a metal cabling. Alternatively, they may be made of rope. Preferably, they may be flexible to allow some give or to become slack. In other arrangements, they may be ridged.

In some arrangements the handle may be a single handle and the first weight may be a single handle weight. In other arrangements there may be a plurality of handles or handle weights. For instance, there may be two handles arranged to drive the generator. For instance, at opposite ends of a drive shaft.

In some arrangements, the piston arranged to move the weight along the handle is a first piston, and the apparatus further comprises a second piston arranged to move the second weight.

The pistons may be hydraulically driven. Having hydraulic pistons provides an easy to control system for moving the parts of the apparatus. Alternatively, the pistons could be electrically driven. Thus, where it is discussed herein that a weight is moved by the piston, or the piston is configured to move a weight, for example, a skilled person will understand that the piston is being actuated to move the weight by a suitable hydraulic or electrical circuit that may be a part of the apparatus or may simply be connected to the apparatus. Said actuation is preferably performed by an automated control system.

In some arrangements, the handle is rotatably coupled (or connected) to the generator via a gearbox. The generator may comprise a drive shaft, the rotation of the handle configured to drive the drive shaft and thereby generate electricity. In some arrangements, the driveshaft is connected via the gearbox to the output portion of the generator, which converts the rotational motion of the driveshaft into electricity.

The gearbox may be connected to the output portion of the generator via a transmission shaft, wherein a brake system is connected to the transmission shaft. The transmission shaft may extend from the gearbox perpendicular to the drive shaft. The gearbox may have one or more gears to convert the rotation of the driveshaft to the rotation of the transmission shaft. The brake system may comprise a brake disc and a hydraulic brake piston. Advantageously, the brake system may allow the apparatus to be stopped once moving, and to maintain the apparatus in stationary position once stopped.

In some arrangements, the generator may further comprise a ring generator. The driveshaft may be connected to the ring generator, which converts the rotational motion of the driveshaft into electricity. The ring generator may reduce energy consumption compared to using the gearbox. As such, the ring generator may be used for larger power output. For instance, a gearbox may be used to provide output up to 300 kW, whereas the ring generator may be used to provide an output up to 7 MW. The ring generator may operate at 5 rpm. In other arrangements the ring generator may operate at different rate.

In some arrangements, the second weight may be a single counterweight. In other arrangements there may be a plurality of counterweights. The size of the counterweight may be selected based on the size of the desired output. In some arrangements, the counterweight may weight up to 150 tonnes. For instance, the counterweight for the ring generator arrangement may be 100 tonnes. Whereas, the counterweight for the gearbox arrangement may be 15 tonnes.

Also described herein is a method for generating electrical power in an apparatus comprising a handle having a first end coupled to a generator, and a second end that is rotatable about the generator, such that it is rotatable 360° about the first end in a substantially vertical plane from a top dead centre (TDC) position, through a bottom dead centre (BDC) position, and back to the top dead centre (TDC) position, the handle comprising a movable weight and a piston, the method comprising: during rotation of the handle from the TDC position to the BDC position, actuating the piston to move the weight along the handle from a second position to a first position, so that the weight is at the first position when the handle is at approximately BDC; and during rotation of the handle from the BDC position to the TDC position, actuating the piston to move the weight along the handle from the first position to the second position, so that the weight is at the second position when the handle is at approximately TDC; wherein, in the first position the weight is proximal to the first end of the handle, and in the second position the weight is proximal to the second end of the handle, such that, when in the second position the weight provides a mechanical advantage as the handle rotates from TDC to BDC due to gravity acting on it, whereby rotation of the handle drives the generator thereby to generate electrical power.

Also described herein is an apparatus for generating electrical power comprising: a support column extending vertically from a base frame and rigidly connected thereto; a tiltable platform comprising a first end and a second end, the tiltable platform attached to the support column via a pivot attachment located between the first and second end of the tiltable platform; a counterweight mounted upon the tiltable platform, the counterweight movable between the first end and the second end of the tiltable platform; a rotation device located on the base frame, the rotation device comprising: a drive shaft; and a rotating handle, the handle configured to rotate about an axis of rotation at an end of the handle connected to the drive shaft to drive the drive shaft and thereby generate electricity, the handle comprising a handle weight movable along the handle radially with respect to the axis of rotation; a swing arm, attached to an end of the support column furthest from the base, such that the tiltable platform is attached to the support column between the swing arm and the base, the swing arm attached to the support column via a pivot attachment located between a first and a second end of the swing arm, the swing arm connecting the tiltable platform and the rotating handle, such that during a full rotation of the handle the swing arm and tiltable platform are configured to swing about their respective pivot attachments thereby raising their respective first end and second ends alternately.

Preferably, the apparatus may be configured such that just before the handle reaches the top of its rotation (e.g. TDC), the handle weights are moved away from the axis of rotation and the counterweight is moved to the raised first end of the tiltable platform, thereby to increase the turning force exerted by the weights; and wherein the apparatus is configured such that just before the handle reaches the bottom of its rotation (e.g. BDC), the handle weights are configured to move towards the axis of rotation and the counterweight is configured to move to the raised second end of the tiltable platform, thereby to decrease the turning force exerted by the weights.

Preferably, the device may comprise a piston connected at a first end to the base or support column, and at a second end to the swing arm, to assist the motion of the swing arm. The piston may be a first piston connected between the support column and the first end of the swing arm, and a second piston connected between the base and the second end of the swing arm. The second piston may be connected to the second end of the swing arm through a pulley system.

Preferably, the rotation device may further comprise a gearbox wherein the driveshaft is connected via the gearbox to a generator, which converts the rotational motion of the driveshaft into electricity. The gearbox may be connected to the generator via a transmission shaft, wherein a brake system is connected to the transmission shaft.

Preferably, the rotation device may further comprise a ring generator, wherein the driveshaft is connected to a ring generator, which converts the rotational motion of the driveshaft into electricity. Preferably, the handle may further comprise a piston configured to move the handle weights radially with respect to the axis of rotation. Preferably, the tiltable platform may comprise a piston configured to move the counterweight along the platform.

Preferably, the counterweight may be housed on a carrier located on the tiltable platform, the carrier configured to move along the tiltable platform. Preferably, the tiltable platform may be suspended from the swing arm by one or more cables. Preferably, the tiltable platform may be suspended from the swing arm by a first cable attached between the first end of the tiltable platform and the first end of the swing arm, and a second cable attached between the second end of the tiltable platform and the second end of the swing arm. Preferably, the tiltable platform may be attached to the support column at a point midway between the swing arm and the base.

A power station, or similar, may comprise an apparatus and/or implement a method as defined above and/or described herein.

BRIEF DESCRIPTION OF THE DRAWINGS

One or more exemplary embodiments of the invention will now be described with reference to the accompanying figures, in which.

DETAILED DESCRIPTION

Figure 1:
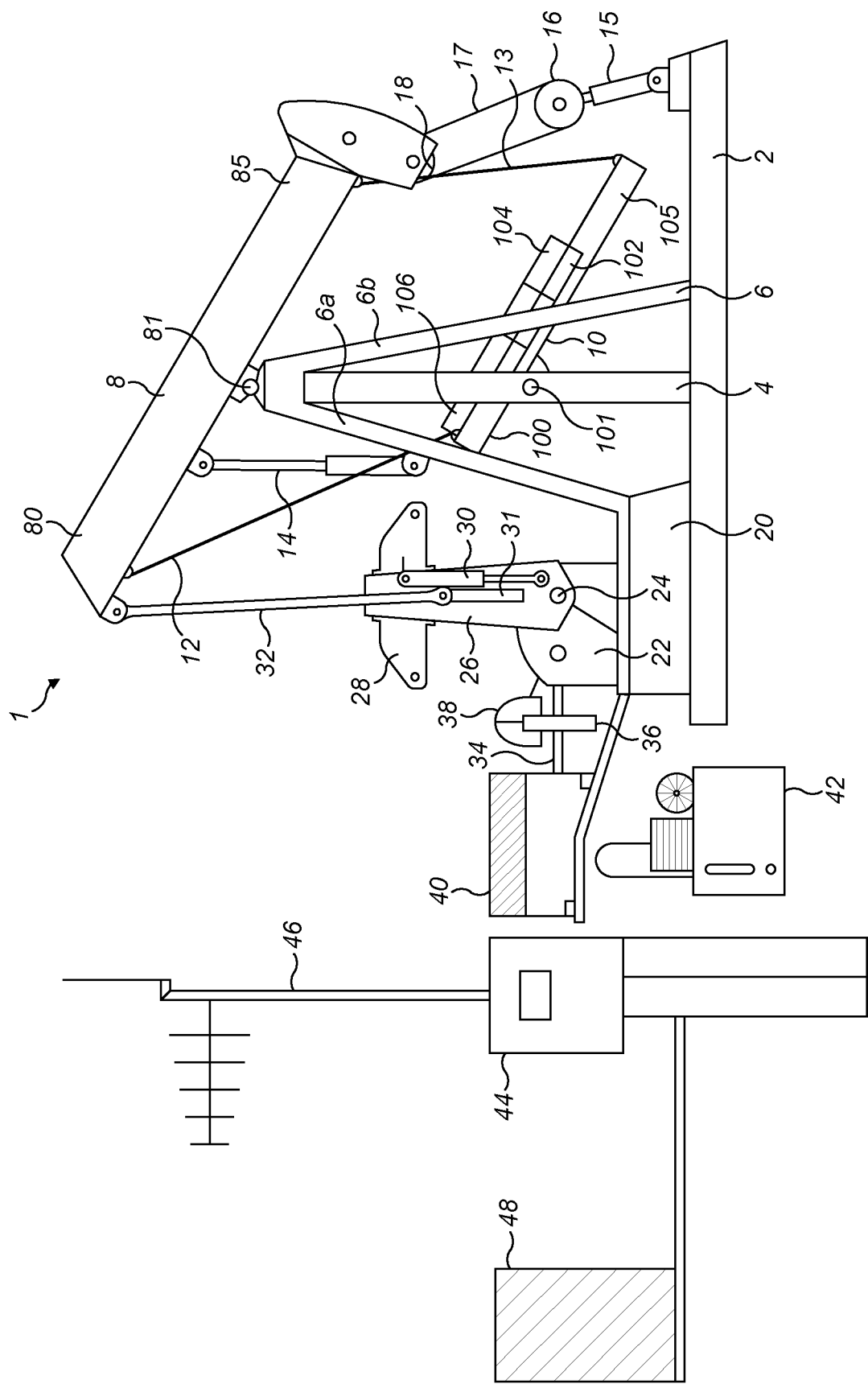
FIG. 1 shows a side on view of an apparatus for generating electrical power, having a rotatable handle coupled to a generator, according to a first embodiment of the invention at a first position in a single cycle of motion when the handle of the apparatus is at top dead centre (TDC)

In the following description and accompanying drawings, corresponding features may preferably be identified using corresponding reference numerals.

FIG. 1 shows an apparatus for generating electrical power 1. The apparatus includes a base plate 2 resting on or fixed to the ground. Rigidly fixed to the base plate 2 is a support column 4, which extends vertically from the base plate 2. On one side of the support column 4 there is an auxiliary platform 20 raised vertically from the base plate 2. The support column 4 is supported by an additional bracing structure 6 with a first arm 6a that connects the top of the support column 4 to the auxiliary platform 20, and a second arm 6b that connects the top of the support column 4 to the base plate 2.

A swing arm 8 is pivotally attached by attachment 81 to the top of the support column 4. The swing arm 8 has a first end 80 on the side of the pivot 81 closer to the auxiliary platform 20 and a second end 85 on the side of the pivot 81 further from the auxiliary platform 20. The attachment 81 of the swing arm 8 and the support column 4 is located near the centre of the swing arm 8 between its first end 80 and its second end 85.

The apparatus 1 also has a counterweight platform 10, otherwise referred to as a tiltable platform, which is pivotally attached by attachment 101 to the support column 4. This attachment 101 of the counterweight platform 10 and the support column 4 is located between the base plate 2 and the swing arm 8. The counterweight platform 10 also has a first end 100 on the side of the pivot 101 closer to the auxiliary platform 20 and a second end 105 on the side of the pivot 101 further from the auxiliary platform 20.

A cable 12 connects the first end of the swing arm 80 to the first end of the counterweight platform 100. A further cable 13 connects the second end of the swing arm 85 to the second end of the counterweight platform 105. As a result of the cables 12, 13, rotation of the swing arm 8 will be transmitted through one or both the cables into rotation of the counterweight arm 10 and vice versa. As such, the swing arm 8 and counterweight arm 10 will move in unison.

There is a first lifting piston 14 with its first end pivotally attached to the first arm 6a of bracing structure 6 and its second end pivotally attached towards the first end of the swing arm 80.

There is a second lifting piston 15 with its first end pivotally attached to the base plate 2 and its second end to a pulley 16. The pulley 16 is further connected by a cable 17 to a second pulley 18 on the second end of the swing arm 85. The use of the pulley system reduces the force required by the second lifting piston 15.

On the counterweight platform 10 is mounted a movable carrier 102. Upon the movable carrier 102 a counterweight 104 is fixed. A counterweight piston 106 is located on counterweight platform 100, with one end of the counterweight piston 106 attached to the first end of the counterweight platform 100, and the other end to the movable carrier 102.

A gearbox 22 is rigidly located on auxiliary platform 20, thereby providing the gearbox 22 vertical clearance from the base plate 2 and the ground. The gearbox 22 has a rotational axis perpendicular to an axis formed between the first and second end of the swing arm. A driveshaft 24 extends along this axis. Attached to the driveshaft 24 are two handles 26, one on either side of the gearbox 22. The handles 26 extend radially outward from the rotational axis. Mounted to each of the handles 26 is a handle weight 28. Each handle has an associated handle piston 30 which are attached with one end on the handle 26 close to the rotational axis and the other end on the handle weight 28.

Each handle 26 is attached by a rod 32 which has its first end pivotally attached to the first end of the swing arm 80.

The second end of the rod 32 is fixed into a slot 31 which runs along the radial direction of the handle 26 such that the second end of the rod can slide radially towards and away from the driveshaft 24. The slot allows motion of the handles 26 to be smoothly coupled to motion of the swing arm 8. Note that only one of the handles 26, handle weights 28, handle pistons 30, slots 31, and rods 32 are visible from the view shown in FIGS. 1 to 8.

Extending from the gearbox 22 perpendicular to the rotational axis is a transmission shaft 34. Located within the gearbox 22 are gears to convert the rotation of the driveshaft 24 to the rotation of the transmission shaft 34. On the transmission shaft 34 is a brake disc 36 and hydraulic brake piston 38.

The transmission shaft 34 is attached to a generator 40 which converts the rotational motion of the transmission shaft 34 to electrical power. There is also a transformer 48 which can step up the voltage from the generator 40 prior to transmission of the generated electricity through power lines or other means. All the pistons used in the apparatus are supplied with hydraulic oil from a hydraulic power unit 42. The apparatus is activated using the control box 44 and its internal circuitry is programmed to synchronise the activation and motion of the pistons throughout the apparatus. The control box 44 is connected to an antenna 46 so that it can be controlled remotely.

The apparatus 1 described above is designed such that the position of the handle weights 28 can be utilised for mechanical advantage. The position of the counterweights can also be used to aid in providing mechanical advantage. The principle of operation is that when the handles 26 moving downwards in the gravitational field, the handle weights 28 are radially extended further from the driveshaft 24 to increase the turning force along the axis of the driveshaft 24. When the handles 26 are moving upwards in the gravitational field, the handle weights 28 are radially contracted closer to the driveshaft 24 to decrease the turning force along the axis of the driveshaft 24. A further benefit of retracting the handle weights 28 for when the handles 26 move upwards, is that the moment of inertia of the handles 26 decreases, which accelerates the upward motion. Similarly, the counterweight 104 is moved to the raised second end of the counterweight platform 105 when the handles 26 move upwards in the gravitational field, which increases the turning force about the pivot 101.

When the handles 26 move downwards in the gravitational field, the counterweight 104 is moved closer to the raised first end of the counterweight platform 100, which decreases the turning force about the pivot 101. The timing of these movements is described in detail below.

With reference to FIGS. 1-8, a full cycle of operation of the apparatus 1 (i.e. 360° rotation of the handles 26) will now be described.

Prior to operation, the hydraulic oil used in the pistons is heated in the hydraulic power unit 42. A signal from the control unit 44 will deactivate the brake piston 38 which releases the brake disc 36. The signal to begin operating can be received remotely with antenna 46. In addition, the signal can be provided locally using a physical switch on the control unit 44.

For convenience the position of the handles 26 will be described with reference to their angle measured clockwise from the vertical axis in degrees)(°. The cycle of operation is described below. Note that while the cycle is described starting with the handles 26 in the 0° position, the cycle may start equivalently from another position of the handles 26.

In FIG. 1, the handles 26 are in the 0° position, otherwise referred to as top dead centre (TDC). The handle piston 30 has fully expanded so that the handle weights 28 are fully extended radially from the driveshaft 24. The counterweight piston 106 has fully contracted so that counterweight 104 on its movable carrier 102 is fully towards the first end of the counterweight arm 100. As a result of the rods 32 connecting the handles 26 to the swing arm 8, the swing arm 8 is tilted about its pivot 81 so that its first end 80 is raised into its highest position and its second end 85 is lowered into its lowest position. As a result of the cables 12, 13 connecting the swing arm 8 to the counterweight arm 10, the counterweight arm 10 is similarly tilted about its pivot 101 so that its first end 100 is raised into its highest position and its second end 105 is lowered into its lowest position. The first lifting piston 14 is fully extended, and the second lifting piston 15 is fully contracted. The inertia in the rotating handles 26 from their motion into the 0° position will keep the handles 26 moving in the clockwise direction.

Figure 2:
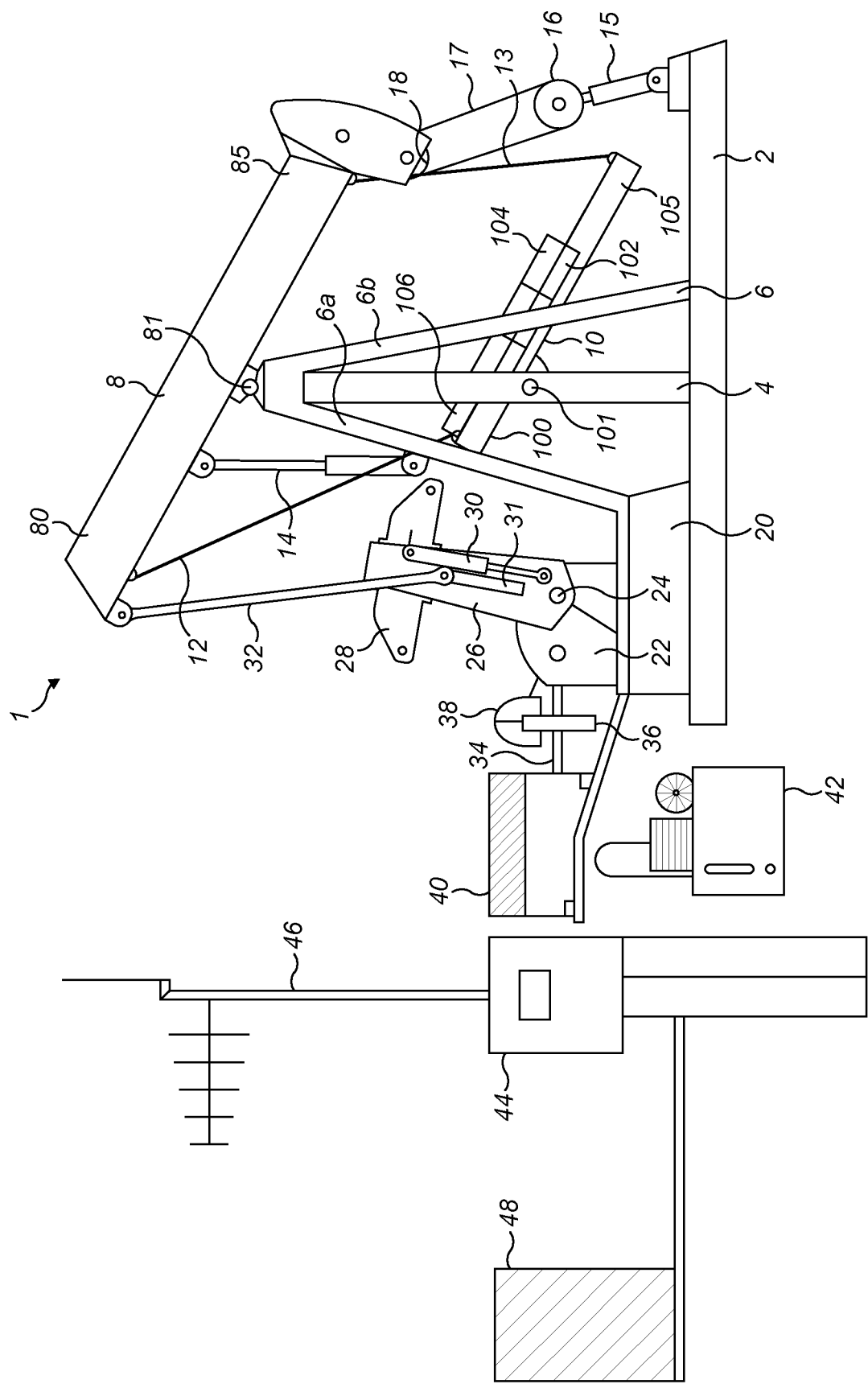
FIG. 2 shows a side on view of the apparatus for generating electrical power according to the first embodiment of the invention at a second position when the handle of the apparatus is 10° past TDC.

In FIG. 2, the handles 26 are in the 10° position. The handle piston 30 is still fully expanded so that the handle weights 28 are still fully extended radially from the driveshaft 24. The counterweight piston 106 is still fully contracted so that counterweight 104 on its movable carrier 102 is still fully towards the first end of the counterweight arm 100. As the handles 26 turn clockwise, falling through gravity, the rods 32 will pull down the first end of the swing arm 80, causing the swing arm 8 to rotate about its pivot 81 in an anticlockwise direction. Similarly, the counterweight platform 10, suspended from the swing arm 8 by cables 12, 13, will also rotate about its pivot 101 in an anticlockwise motion. As this occurs, the first lifting piston 14 will passively contract, and the second lifting piston 15 will passively expand. Due to the counterweight 104 being at the first end of the counterweight platform 100 and the handle weights 28 being radially extended from the driveshaft 24, the clockwise turning force exerted by the counterweight platform 10 on the swing arm 8 will be less than the anticlockwise turning force exerted by the handles 26 on swing arm 8. This leads to overall anticlockwise rotation of the swing arm 8 and overall clockwise motion of the handles 26 and the driveshaft 24.

Figure 3:
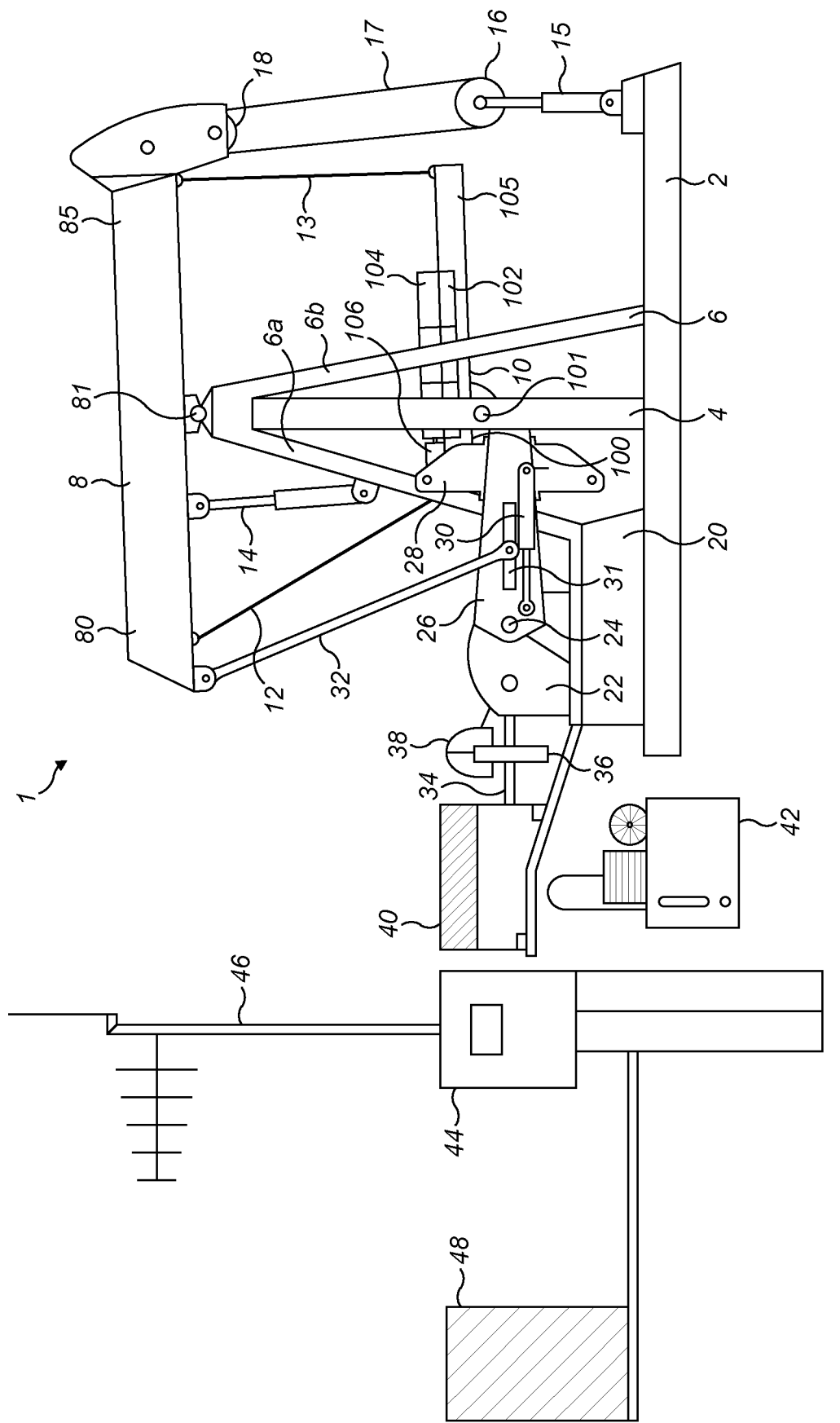
FIG. 3 shows a side on view of the apparatus for generating electrical power according to the first embodiment of the invention at a third position when the handle of the apparatus is 90° past TDC.

In FIG. 3, the handles 26 are in the 90° position. The handle piston 30 is still fully expanded so that the handle weights 28 are still fully extended radially from the driveshaft 24. The counterweight piston 106 is still fully contracted so that counterweight 104 on its movable carrier 102 is still fully towards the first end of the counterweight arm 100. As the handles 26 continue to turn clockwise, the rods 32 will continue to pull down the first end of the swing arm 80, causing the swing arm 8 to rotate about its pivot 81 in an anticlockwise direction. Similarly, the counterweight platform 10, suspended from the swing arm 8 by cables 12, 13, will continue to rotate about its pivot 101 in an anticlockwise direction. As this occurs, the first lifting piston 14 will continue to passively contract, and the second lifting piston 15 will continue to passively expand. Due to the counterweight 104 being at the first end of the counterweight platform 100 and the handle weights 28 being radially extended from the driveshaft 24, the clockwise turning force exerted by the counterweight platform 10 on the swing arm 8 will be less than the anticlockwise turning force exerted by the handles 26 on swing arm 8. This leads to overall anticlockwise rotation of the swing arm 8 and overall clockwise motion of the handles 26 and the driveshaft 24.

Figure 4:
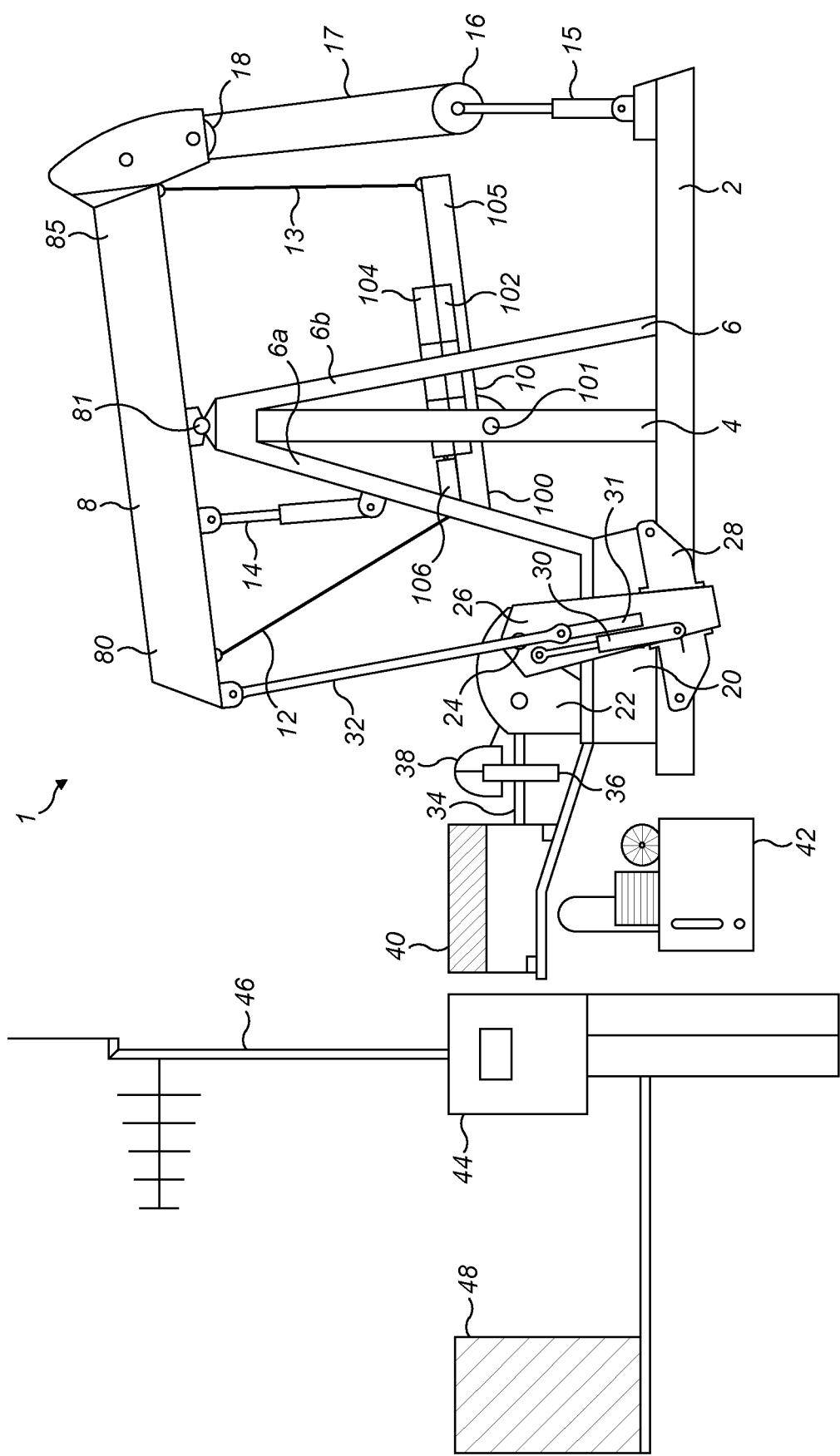
FIG. 4 shows a side on view of the apparatus for generating electrical power according to the first embodiment of the invention at a fourth position when the handle of the apparatus is 170° past TDC.

In FIG. 4, the handles 26 are the 170° position. After the apparatus reaches the position shown in FIG. 4 the handle pistons 30 will begin to contract, and will begin to pull the handle weights 28 radially towards the driveshaft 24. Similarly, the counterweight pistons 106 will begin to expand and will push the counterweight 104 on its movable carrier towards the second end of the counterweight arm 105. As the handles 26 continue to turn clockwise, the rods 32 will continue to pull down the first end of the swing arm 80 causing the swing arm 8 to rotate about its pivot 81 in an anticlockwise motion. Similarly, the counterweight platform 10, suspended from the swing arm 8 by cables 12, 13, will continue to rotate about its pivot 101 in an anticlockwise motion. As this occurs, the first lifting piston 14 will continue to passively contract, and the second lifting piston 15 will continue to passively expand.

Figure 5:
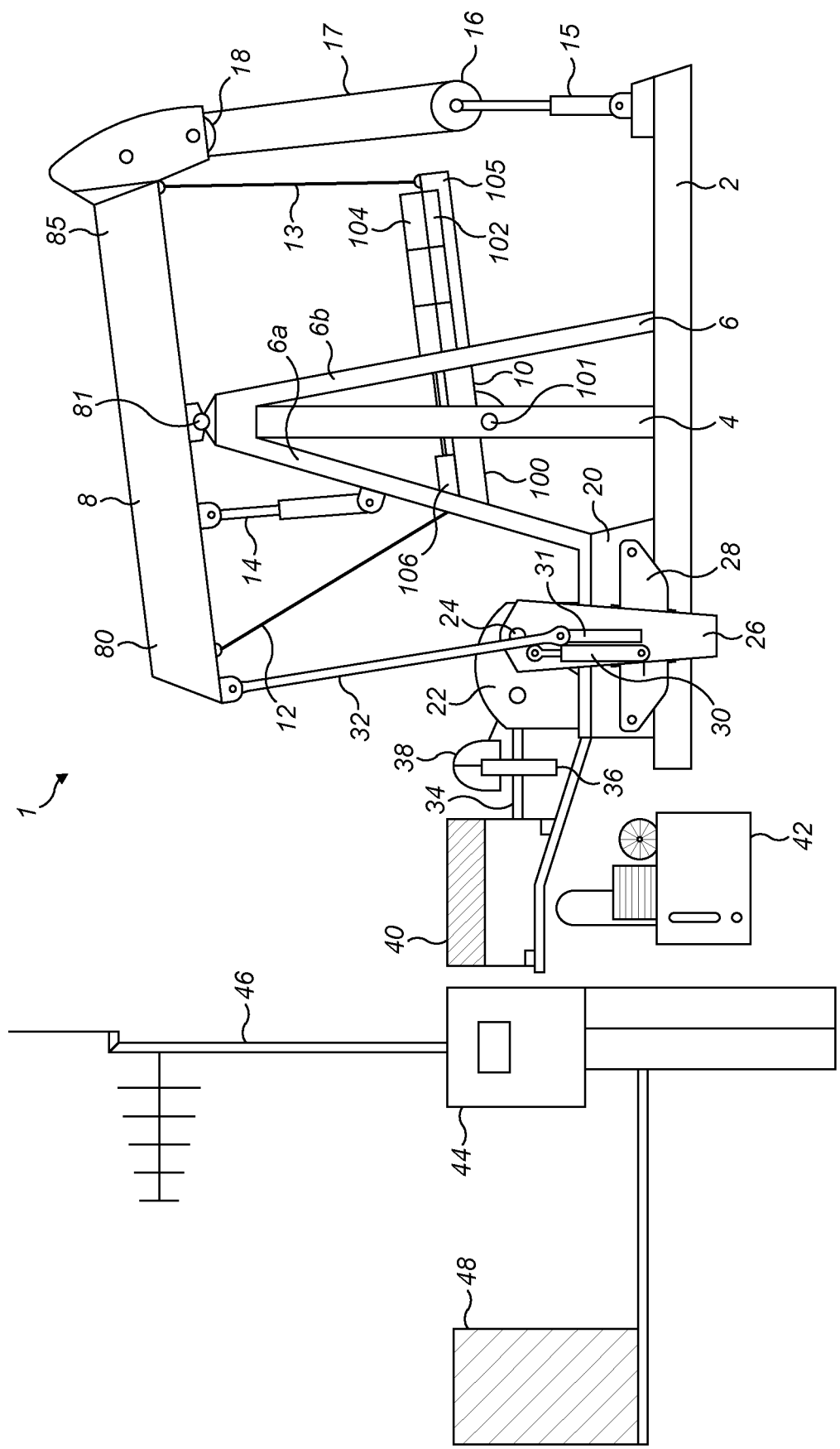
FIG. 5 shows a side on view of the apparatus for generating electrical power according to the first embodiment of the invention at a fifth position when the handle of the apparatus is at bottom dead centre (BDC)

In FIG. 5, the handles 26 are in the 180° position, otherwise referred to as bottom dead centre (BDC). At the moment shown in FIG. 5, the motion of the handle weights 28 and the counterweight 104 on its movable carrier 102 has now been completed. The handle piston 30 is now fully contracted so that the handle weights 28 are now fully retracted radially towards the driveshaft 24. The counterweight piston 106 is now fully expanded so that counterweight 104 on its movable carrier 102 is now fully towards the second end of the counterweight arm 105. As a result of the rods 32 connecting the handles 26 to the swing arm 8, the swing arm 8 is tilted about its pivot 81 so that its first end 80 is lowered into its lowest position and its second end 85 is raised into its highest position. As a result of the cables 12, 13 connecting the swing arm 8 to the counterweight platform 10, the counterweight platform 10 is similarly tilted about its pivot 101 so that its first end 100 is lowered into its lowest position and its second end 105 is raised into its highest position. The first lifting piston 14 is now fully contracted, and the second lifting piston 15 is now fully extended. The inertia in the rotating handles 26 will keep the handles 26 moving in the clockwise direction.

Figure 6:
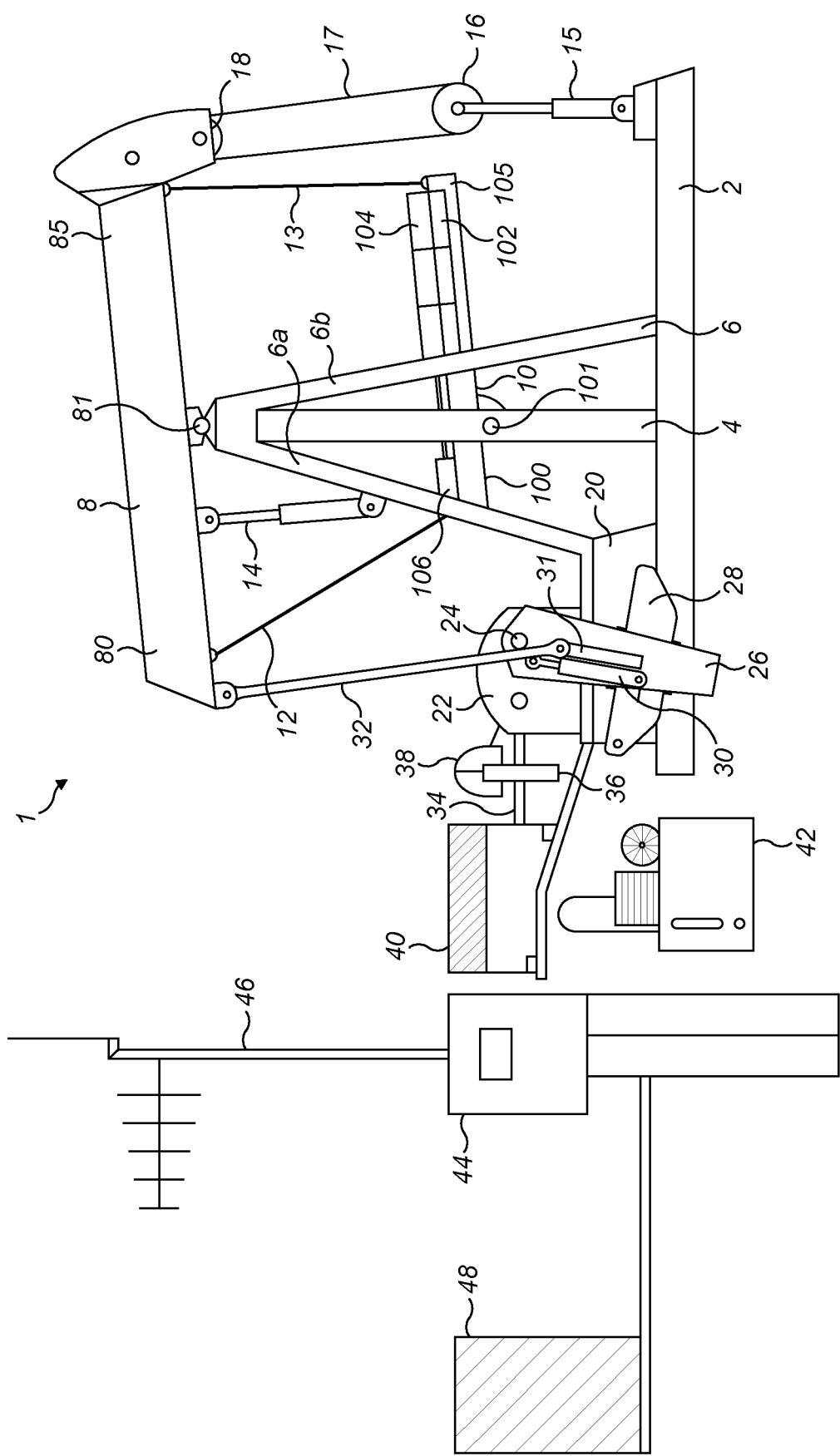
FIG. 6 shows a side on view of the apparatus for generating electrical power according to the first embodiment of the invention at a sixth position when the handle of the apparatus is 10° past BDC.

In FIG. 6, the handles 26 are in the 190° position. The handle piston 30 is still fully contracted so that the handle weights 28 are still fully retracted radially towards the driveshaft 24. The counterweight piston 106 is still fully expanded so that counterweight 104 on its movable carrier 102 is still fully towards the second end of the counterweight arm 105. As the handles 26 and driveshaft 24 continue to turn clockwise, they are aided by rods 32 which are pulled up by the first end of the swing arm 80 which starts to rotate about its pivot 81 in a clockwise motion. The motion of the swing arm 8 is caused through the first lifting piston 14 actively expanding, and the second lifting piston 15 actively contracting. Similarly, the counterweight platform 10, suspended from the swing arm 8 by cables 12, 13, will also rotate about its pivot 101 in a clockwise motion. Due to the counterweight 104 being at the second end of the counterweight platform 105 and the handle weights 28 being radially contracted towards the driveshaft 24, the force required from the lifting pistons 14, 15 will be reduced compared to if the counterweight 104 had remained at the first end of the counterweight arm 100 and if the handle weights 28 had remained radially extended from the driveshaft 24.

Figure 7:
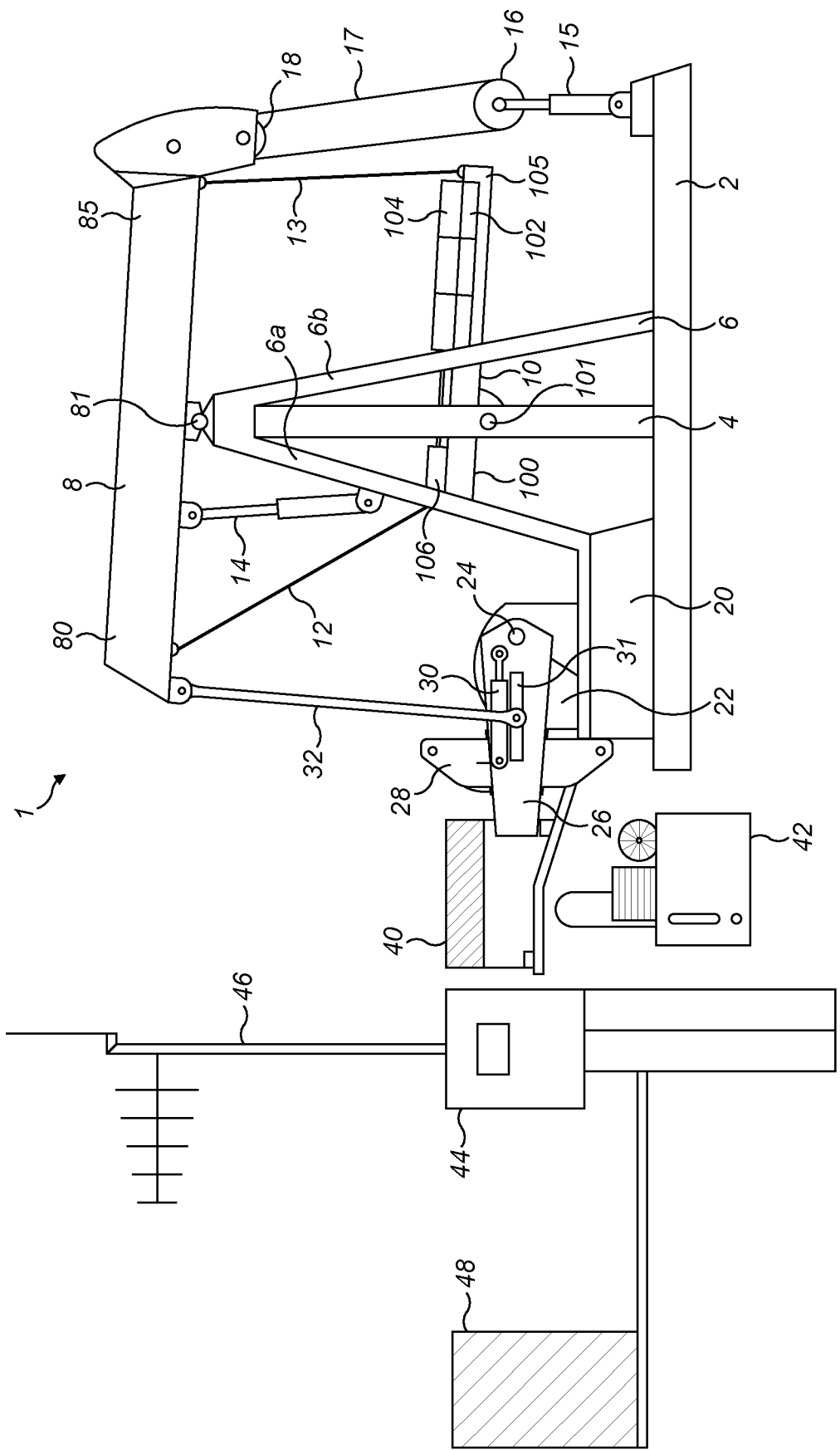
FIG. 7 shows a side on view of the apparatus for generating electrical power according to the first embodiment of the invention at a seventh position when the handle of the apparatus is 90° past BDC.

In FIG. 7, the handles 26 are in the 270° position. The handle piston 30 is still fully contracted so that the handle weights 28 are still fully retracted radially towards the driveshaft 24. The counterweight piston 106 is still fully expanded so that counterweight 104 on its movable carrier 102 is still fully towards the second end of the counterweight arm 105. As the handles 26 and driveshaft 24 continue to turn clockwise, they are aided by rods 32 which are pulled up by the first end of the swing arm 80 which continues to rotate about its pivot 81 in a clockwise motion. The motion of the swing arm 8 is caused through the first lifting piston 14 actively expanding, and the second lifting piston 15 actively contracting. Similarly, the counterweight platform 10, suspended from the swing arm 8 by cables 12, 13, will continue to rotate about its pivot 101 in a clockwise motion. Due to the counterweight 104 being at the second end of the counterweight platform 105 and the handle weights 28 being radially contracted towards the driveshaft 24, the force required from the lifting pistons 14, 15 will be reduced compared to if the counterweight 104 had remained at the first end of the counterweight arm 100 and if the handle weights 28 had remained radially extended from the driveshaft 24.

Figure 8:
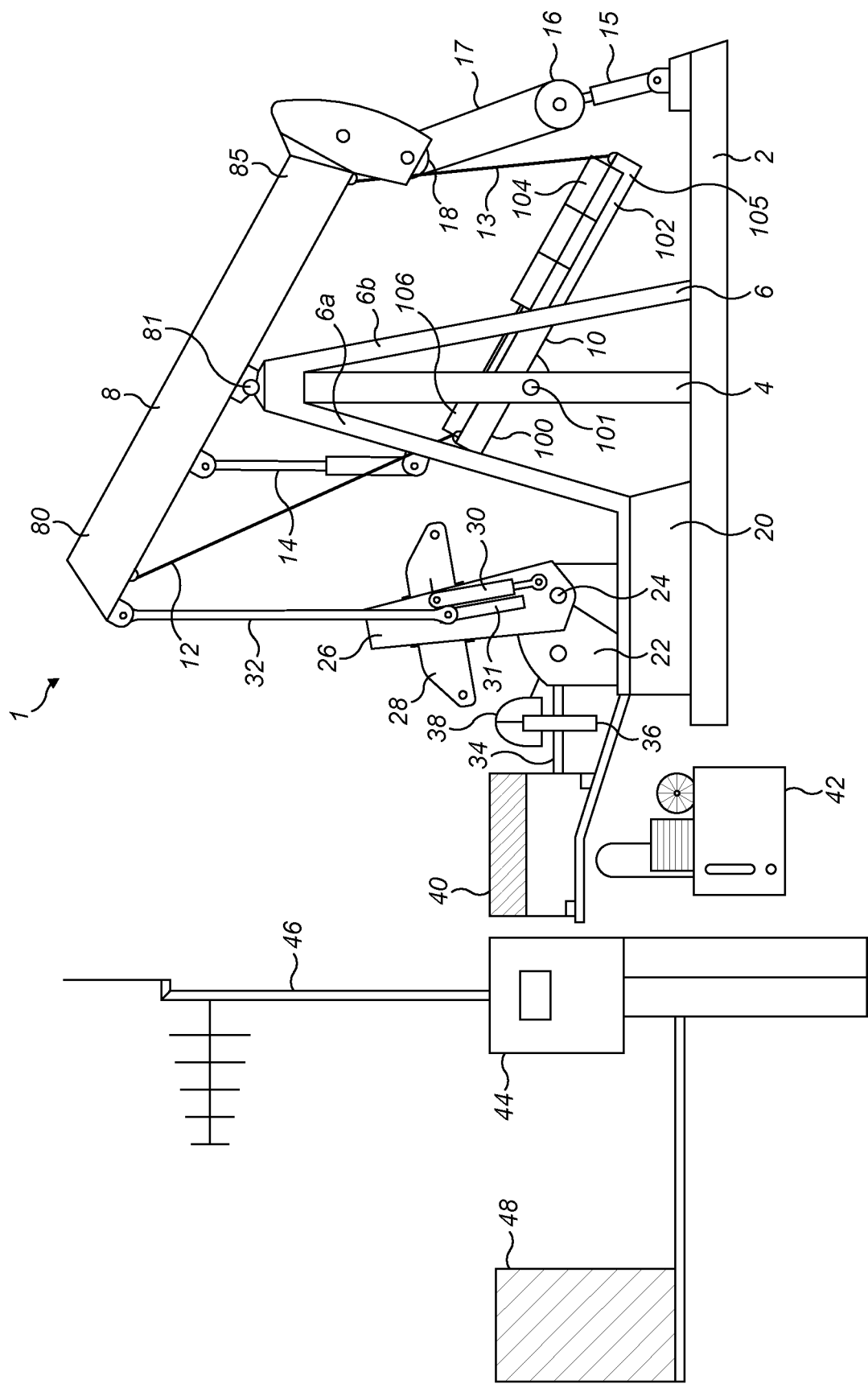
FIG. 8 shows a side on view of the apparatus for generating electrical power according to the first embodiment of the invention at an eighth position when the handle of the apparatus is 170° past BDC.
Figure 9:
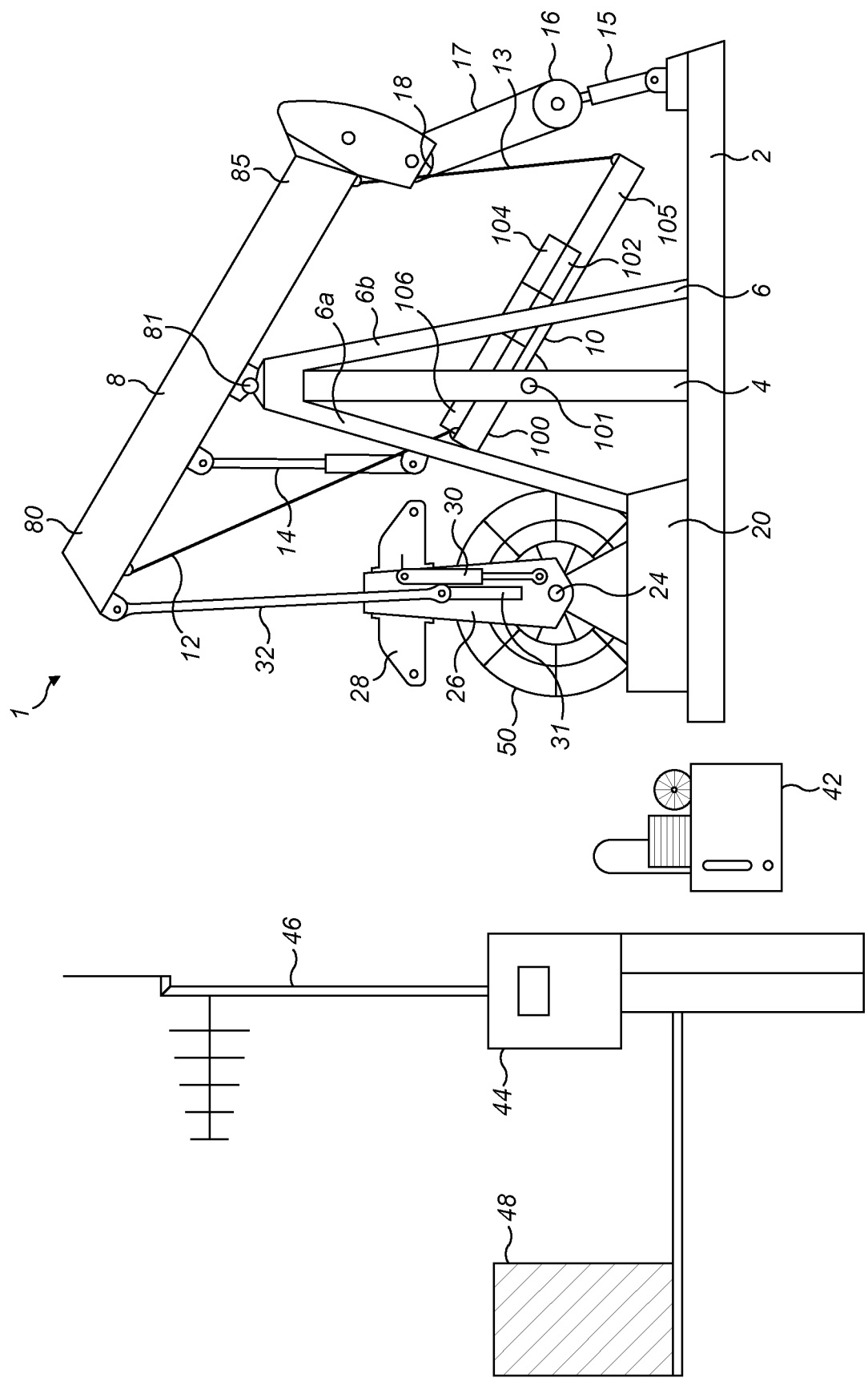
FIG. 9 shows a side on view of an apparatus for generating electrical power, having a rotatable handle coupled to a generator, according to a second embodiment of the invention at a first position in a single cycle of motion when the handle of the apparatus is at top dead centre TDC.
Figure 10:
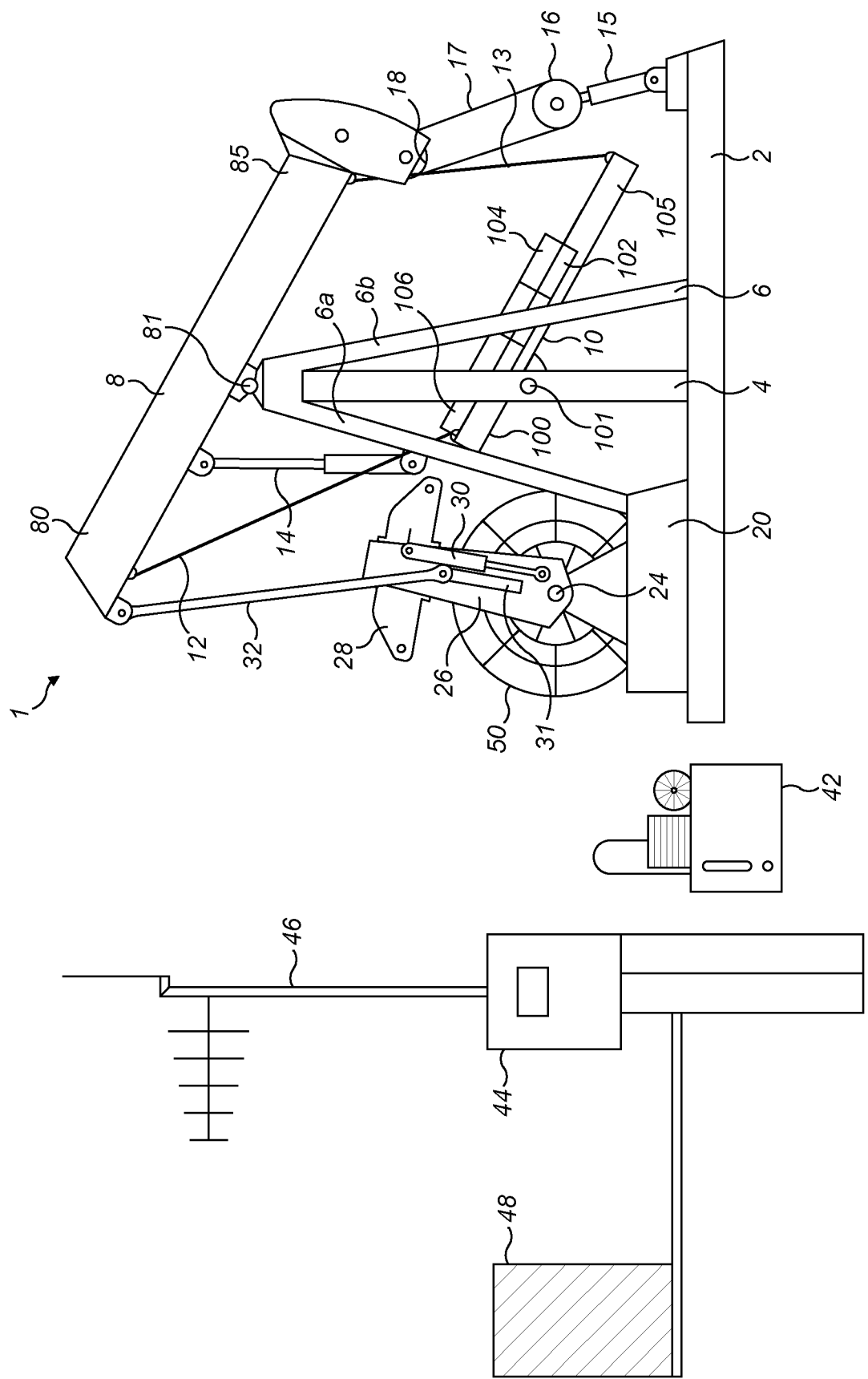
FIG. 10 shows a side on view of the apparatus for generating electrical power according to the second embodiment of the invention at a second position when the handle of the apparatus is 10° past TDC.
Figure 11:
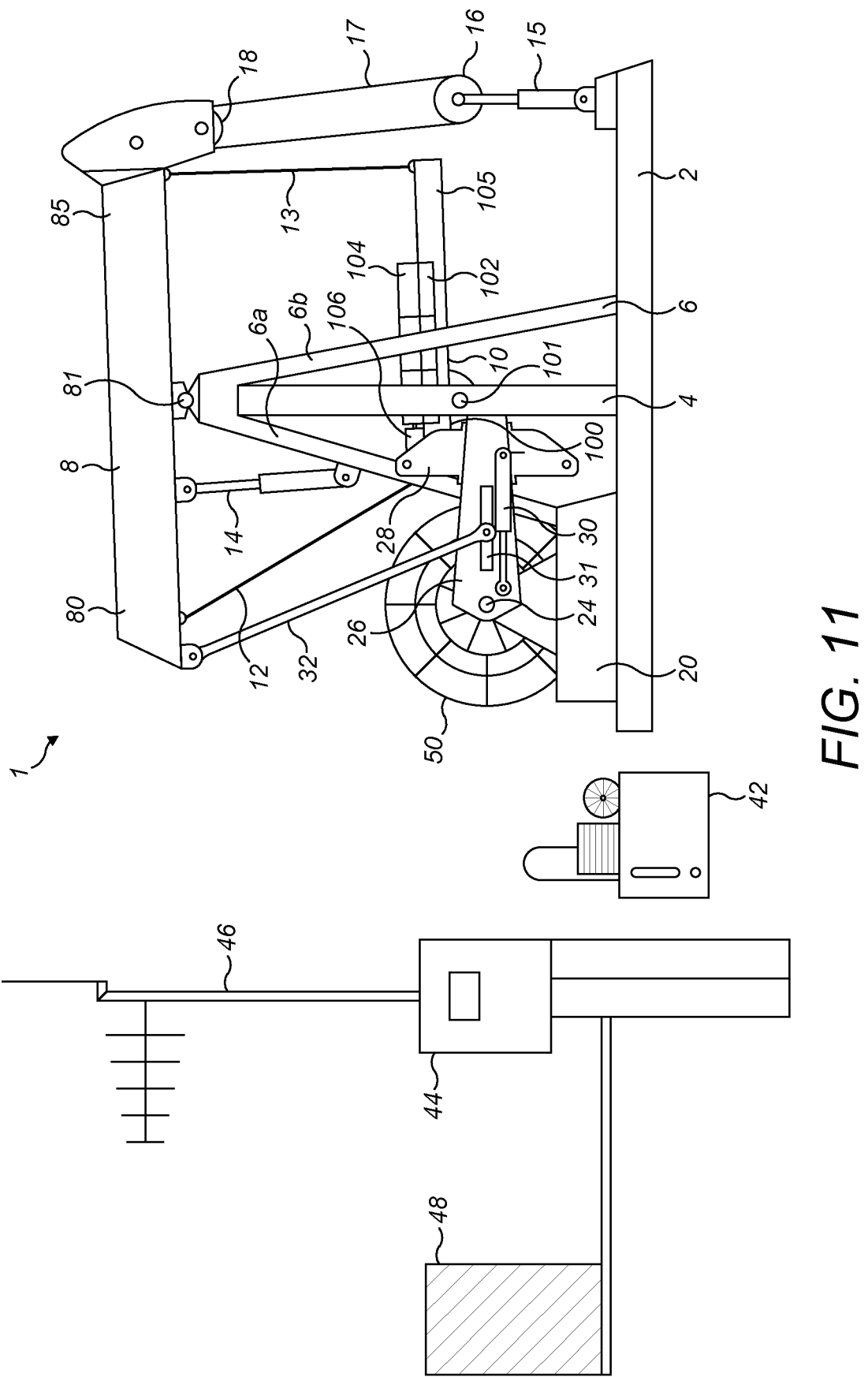
FIG. 11 shows a side on view of the apparatus for generating electrical power according to the second embodiment of the invention at a third position when the handle of the apparatus is 90° past TDC.
Figure 12:
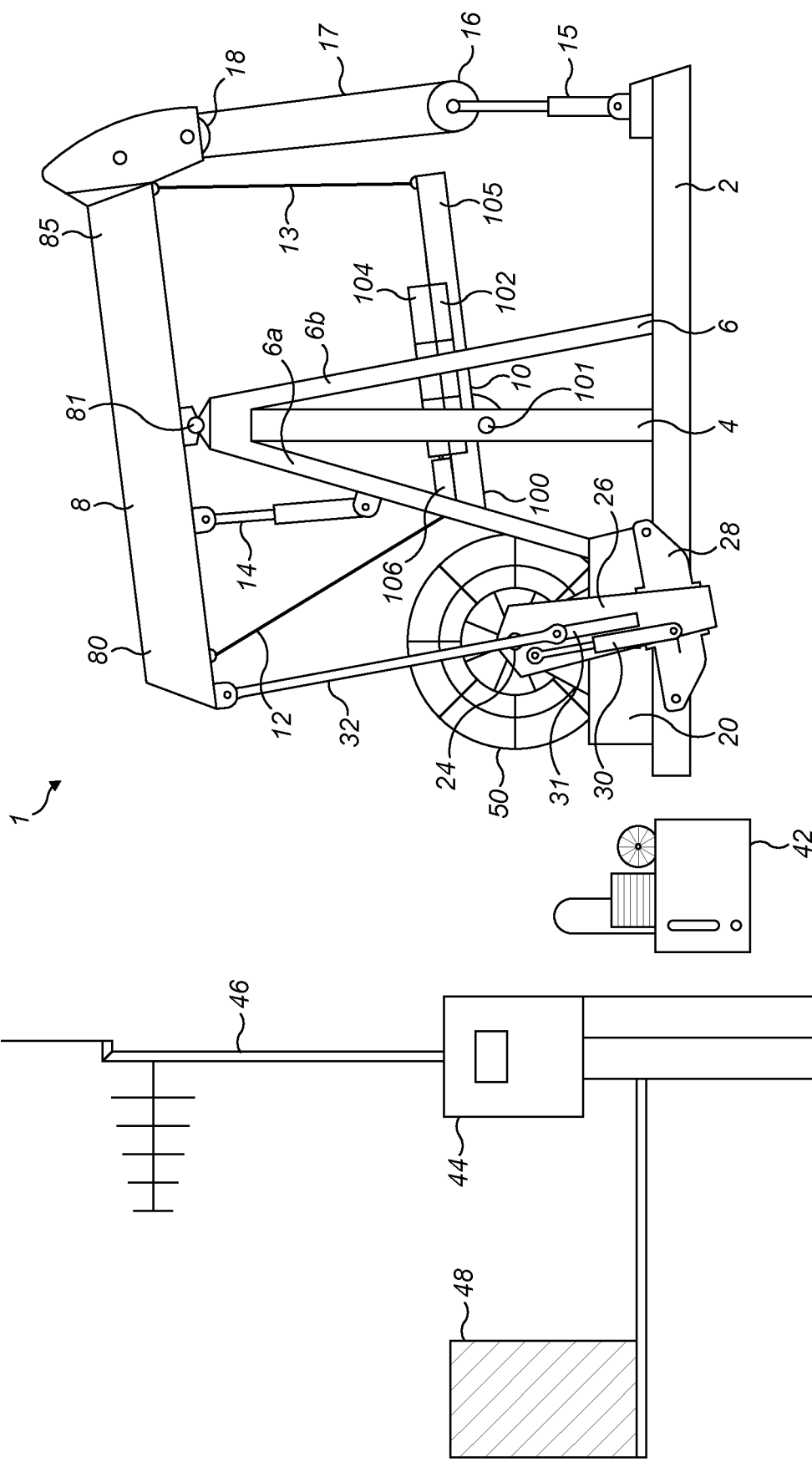
FIG. 12 shows a side on view of the apparatus for generating electrical power according to the second embodiment of the invention at a fourth position when the handle of the apparatus is 170° past TDC.
Figure 13:
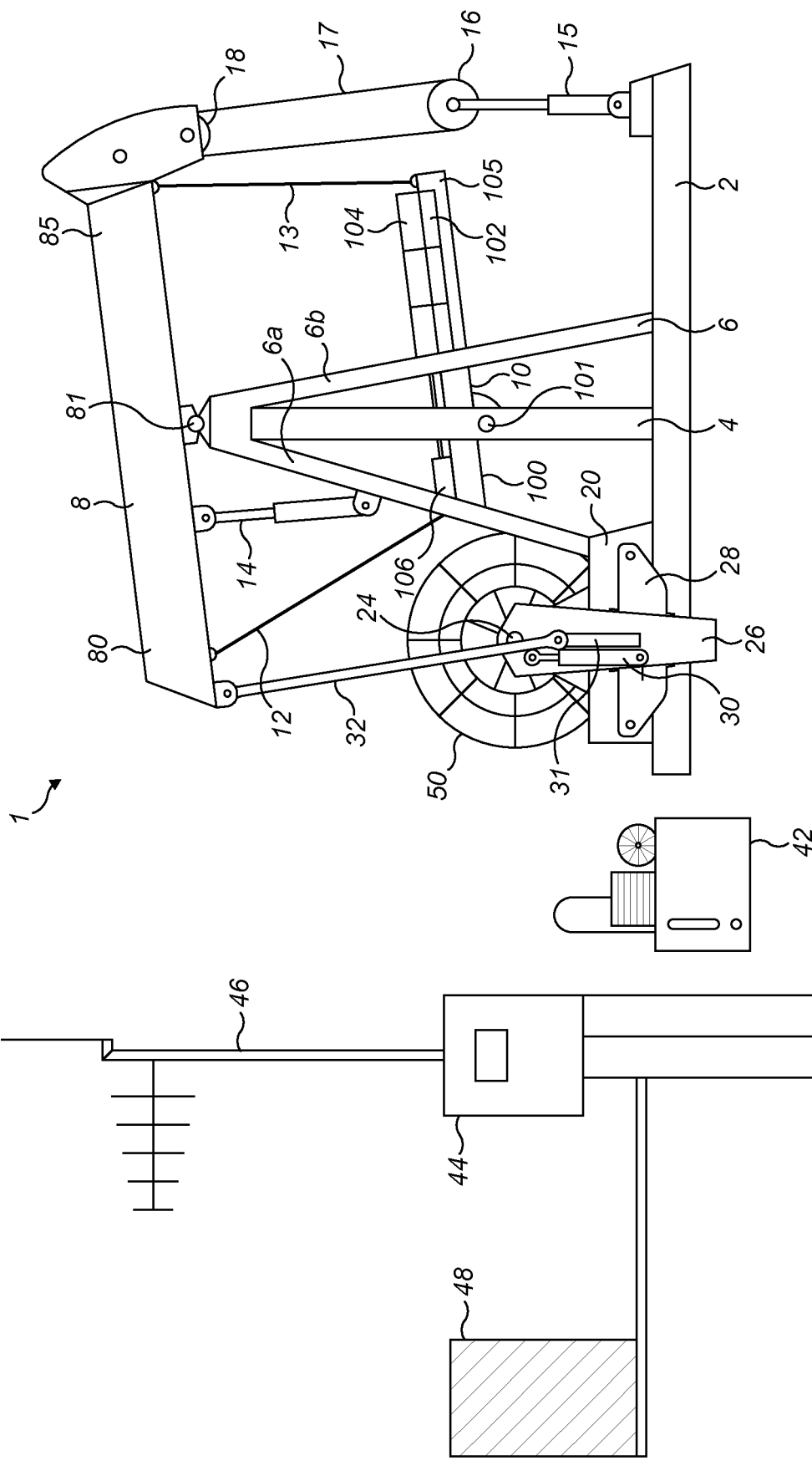
FIG. 13 shows a side on view of the apparatus for generating electrical power according to the second embodiment of the invention at a fifth position when the handle of the apparatus is at BDC.
Figure 14:
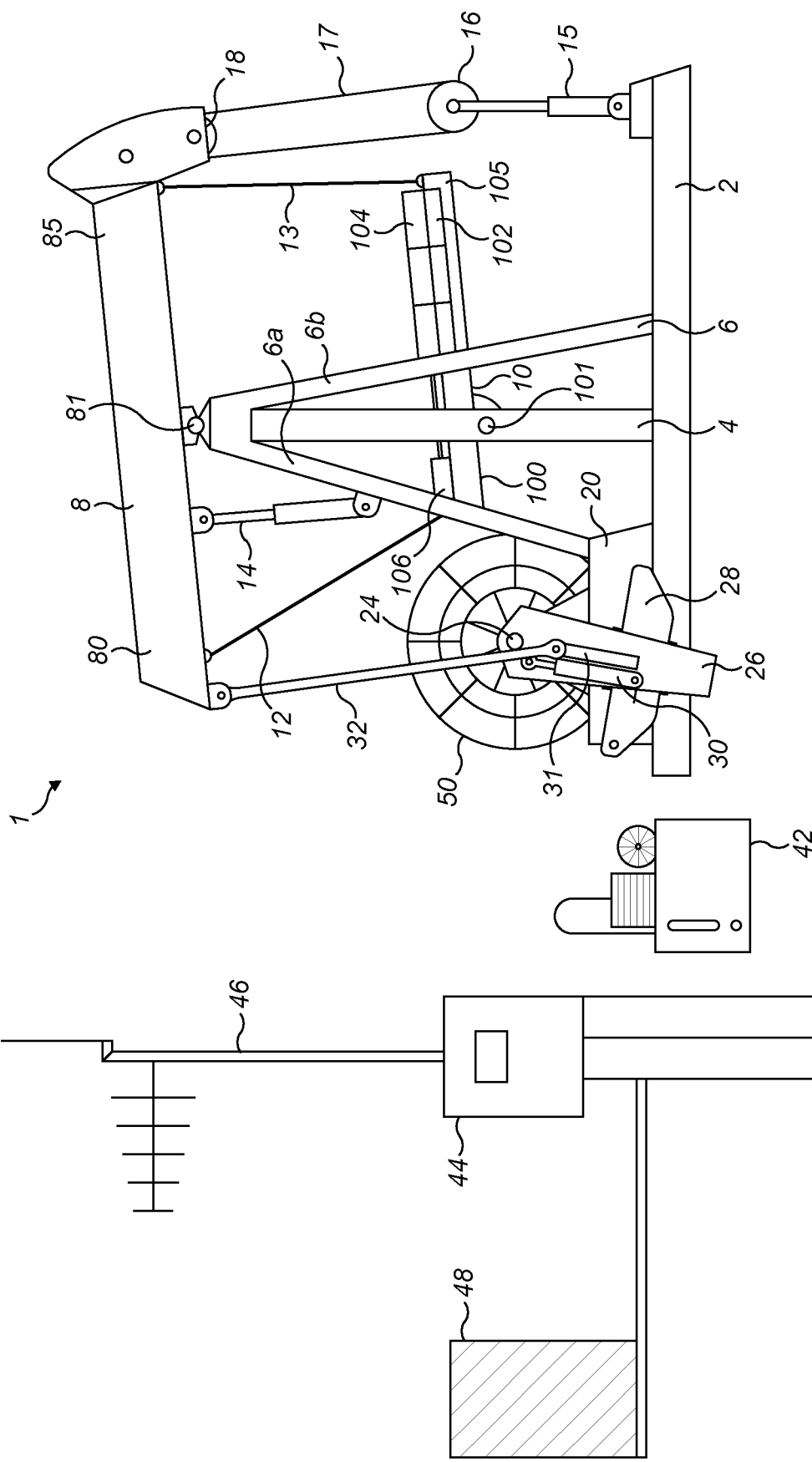
FIG. 14 shows a side on view of the apparatus for generating electrical power according to the second embodiment of the invention at a sixth position when the handle of the apparatus is 10° past BDC.
Figure 15:
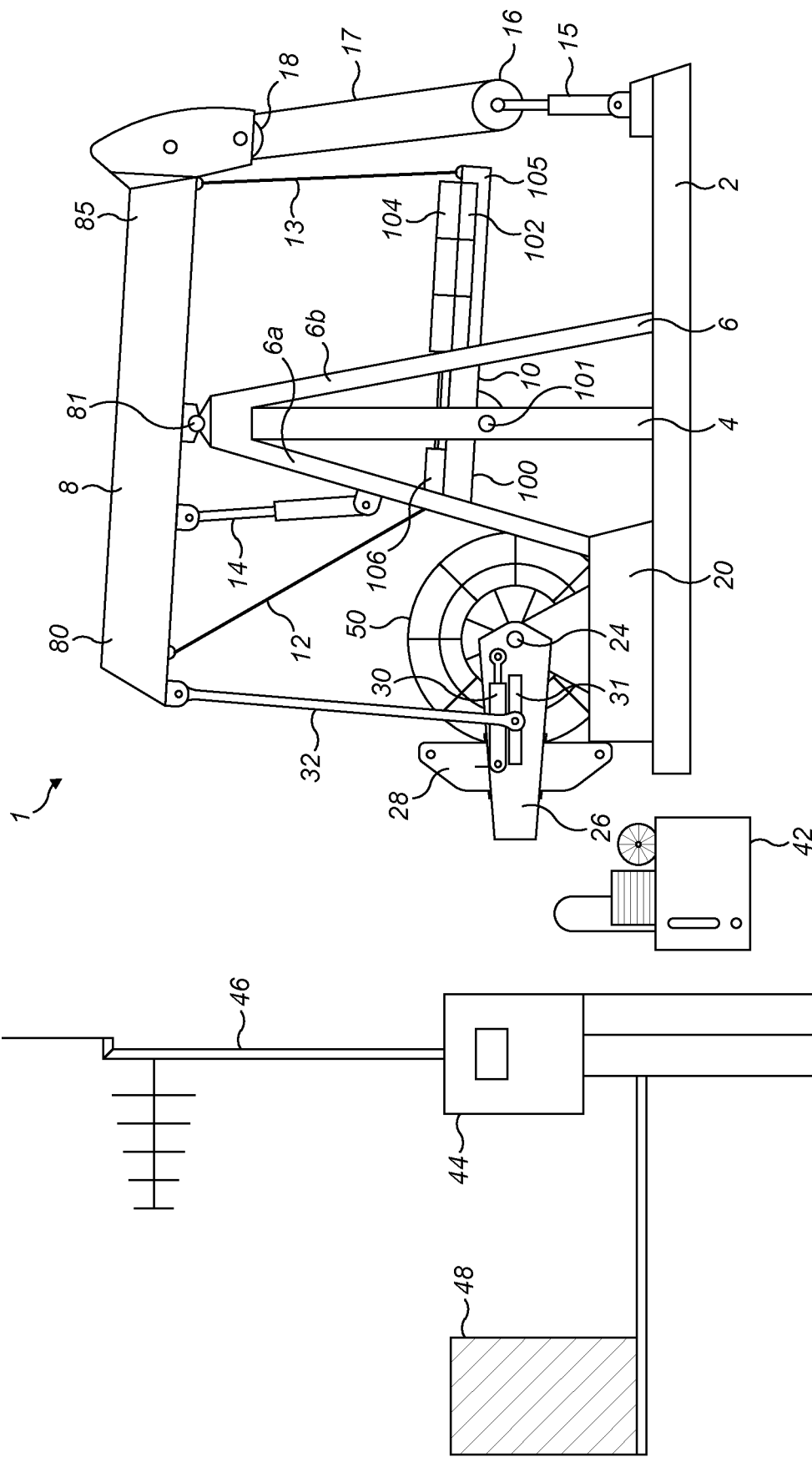
FIG. 15 shows a side on view of the apparatus for generating electrical power according to the second embodiment of the invention at a seventh position when the handle of the apparatus is 90° past BDC.
Figure 16:
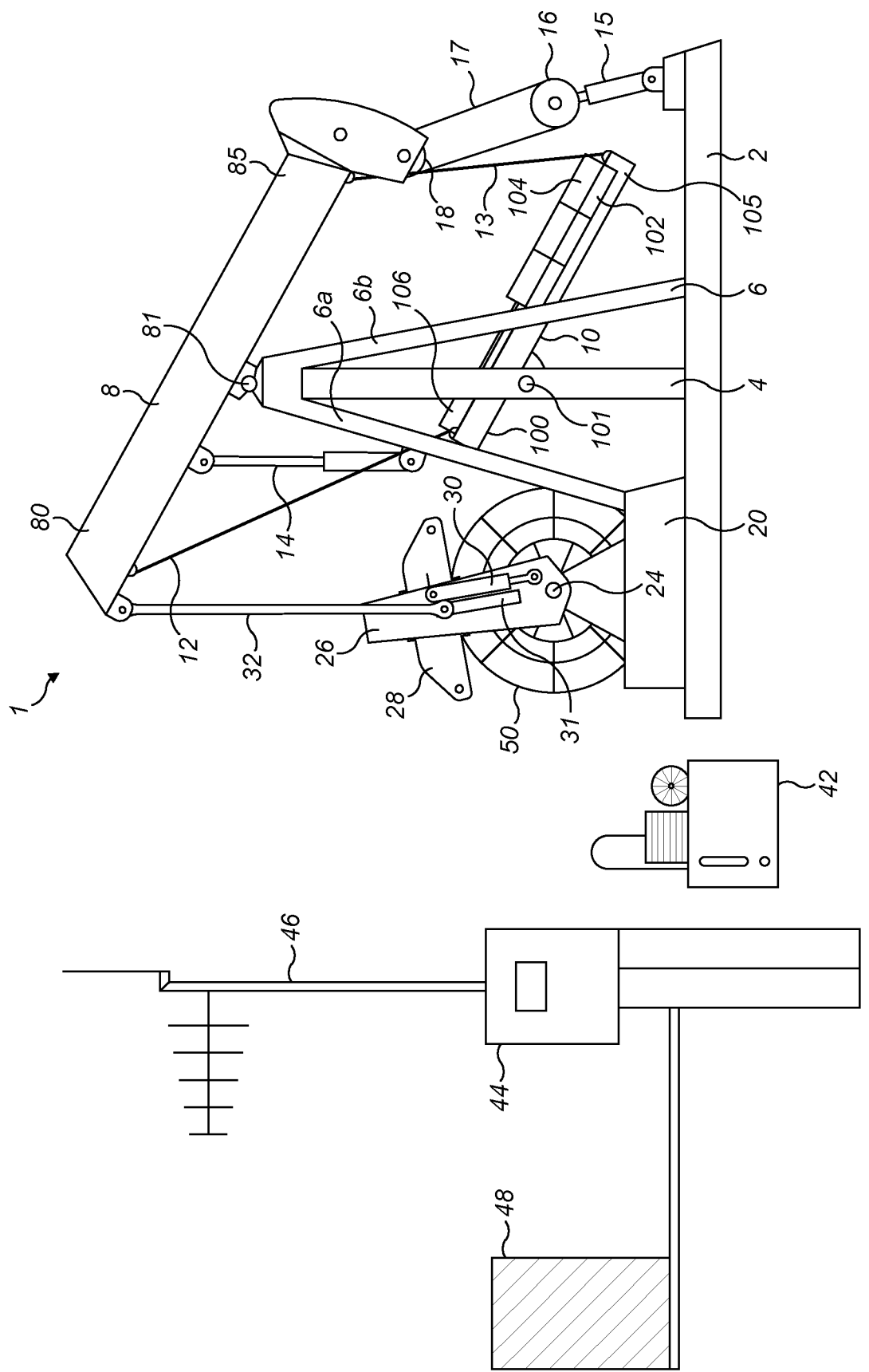
FIG. 16 shows a side on view of the apparatus for generating electrical power according to the second embodiment of the invention at an eighth position when the handle of the apparatus is 170° past BDC.

In FIG. 8, the handles 26 are in the 350° position. After the apparatus reaches the position shown in FIG. 8 the handle pistons 30 will begin to expand, and will begin to push the handle weights 28 radially away from the driveshaft 24. Similarly, the counterweight pistons 106 will begin to contract and will pull the counterweight 104 on its movable carrier towards the first end of the counterweight arm 100. As the handles 26 and driveshaft 24 continue to turn clockwise, they are aided by rods 32 which are pulled up by the first end of the swing arm 80 which continues to rotate about its pivot 82 in a clockwise motion. The motion of the swing arm 8 is caused through the first lifting piston 14 actively expanding, and the second lifting piston 15 actively contracting. Similarly, the counterweight platform 10, suspended from the swing arm 8 by cables 12, 13, will continue to rotate about its pivot 101 in a clockwise motion.

The motion of the handle pistons 30 and counterweight pistons 106 will complete just as the handles 26 once again reach the 0° position, and all elements of the apparatus will once again be in the positions shown in FIG. 1. At this stage a full cycle of operation has been completed, and both the handles 26 and driveshaft 24 will have completed a full rotation. The apparatus will undergo many of the above described cycles during the energy generation process.

The resulting rotation of the driveshaft 24 is converted by the gearbox 22 to rotation in the transmission shaft 34. In the generator 40, this rotational energy may be converted into electrical power during the running of the machine. There is also a transformer 48 that can step up the output voltage prior to transportation of the electricity along power lines or other means.

FIGS. 9 to 16 show an alternative example of a power generation apparatus. In this example, the driveshaft 24 is connected to a ring generator 50 rather than a gearbox 24. The ring generator 50 directly converts the rotational motion of driveshaft 24 into electrical energy.

The movement of the components in FIG. 9-16 is, preferably, identical to the described motion for the previously described exemplary embodiment of FIGS. 1-8. As with that first embodiment, the motion of the handle pistons 30 and counterweight pistons 106 will complete just as the handles 26 once again reach the 0° position (TDC), and all elements of the apparatus will once again be in the positions shown in FIG. 9. At this stage a full cycle of operation has been completed, and both the handles 26 and driveshaft 24 will have completed a full rotation. The apparatus will undergo many of the above described cycles during the energy generation process. The resulting rotation of the driveshaft 24 is converted to electrical power by the ring generator 50. Similarly, there is also a transformer 48 that can step up the output voltage prior to transportation of the electricity along power lines or other means.

The ring generator 50 used in the second embodiment is capable of outputting higher power from the apparatus than the gearbox 22 used in the first embodiment. For instance, the ring generator embodiment may generate power in the order of megawatts, whereas the gearbox embodiment may generate power in the order of kilowatts.

Having described the above exemplary aspects of the invention in detail, it will be apparent to a skilled person that other alternative embodiments of the invention are possible without departing from the scope defined in the appended claims.

The counterweight piston 106 may optionally be attached to the movable platform 102 from the second end of the counterweight platform 105 instead of, or as well as the piston attaching from the first end 100 as shown.

The pivot 101 of the counterweight platform 10 may instead be attached to the support column 4 at a different point on the counterweight platform 10 rather than close to the first end 100 as shown. When it is pivot 101 is closer to the first end 100, the clockwise turning force exerted by the counterweight is reduced when the counterweight moves to the first end of the pivot, as previously described. Alternatively, if the pivot is near the centre of the counterweight platform, when the counterweight is moved to the first end of the counterweight arm 100, it will instead exert an anticlockwise turning force about the pivot, which will also aid the motion of the handles during the first half of the cycle.

The handles 26 may optionally turn anticlockwise during operation of the apparatus rather than clockwise as described above, as this would not change the operating principle of the apparatus.

The hydraulic pistons as shown in the above arrangements may be replaced with any other form of piston or linear actuator.

Rather than having a pulley system and lifting piston attaching the base plate 2 to the second end of the swing arm 85 this may be replaced with a piston connected directly between the two. Either of the lifting pistons 14, 15 may be attached to any of the other static components of the apparatus including but not limited to the base plate 2, support column 4, bracing structure 6, or auxiliary platform 20.

Aspects of the rotational components, such as the gearbox 22 and generator 40 used in the first embodiment, or the ring generator 50 used in the second embodiment may optionally be replaced with any form of power generation that can convert rotational motion into useful work. Similarly, the reciprocating or rotational motion of the various components could also be directly used as mechanical work without first converting to electrical power.

The support column may be formed of a plurality of columns wherein the swing arm 4 and the counterweight platform 10 are attached to different columns, rather than the same column. Similarly, these columns may not extend from a base frame on the floor, but suspended from a frame above or at the side.

There may not be two separate handles 26, handle weights 28, handle pistons 30, slots 31, and rods 32 as shown previously, but there may only be one of each element, or alternatively three or more.

There may be more than one counterweight mounted onto the counterweight arm, and similarly there may be more than one movable carrier 102 and more than one counterweight piston 106. The movable carrier 102 and the counterweight 104 may be permanently connected as one entity, or the counterweight 104 may be removable from the movable carrier 102 to allow for loading of an alternative counterweight.

In the examples described above, the motion of the counterweight 104 and handle weights 28 are, preferably, described as occurring 10° before TDC and BDC of the handle rotation. However, this movement may occur when the handle is at another point in the cycle and the invention should not be understood to be limited as such. For instance, it may occur 5°, 15°, 20°, 25° or more before the top (e.g. TDC) and bottom (e.g. BDC) of the cycle.

Thus, it will be appreciated that any feature in a particular aspect described herein may be applied to any other aspect described herein, in any appropriate combination. It should also be appreciated that particular combinations of the various features described and defined in any aspects described herein can be implemented and/or supplied and/or used independently. Any apparatus feature described herein may also be incorporated as a method feature, and vice versa.

The invention claimed is:

1. An apparatus for generating electrical power, comprising:
    a generator for generating electrical power;
    a handle having a first end rotatably coupled to the generator, and a second end rotatable 3600 about the first end in a substantially vertical plane from a top dead centre (TDC) position, through a bottom dead centre (BDC) position, and back to top dead centre (TDC) position;
    a first weight that is moveable along the handle by a first linear actuator, during rotation of the handle, between a first weight position, in which the first weight is proximal to the first end of the handle, and a second weight position, in which the first weight is proximal to the second end of the handle;
    a swing arm coupled to the handle and operable to rotate the handle from BDC towards TDC when the first weight is in the first weight position on the handle, the swing arm being configured to tilt between a first swing arm position when the handle is at BDC, and a second swing arm position when the handle is at TDC; and a second weight that is moveable by a second linear actuator to assist the tilt of the swing arm between its the first and second swing arm positions;
    wherein the first linear actuator is arranged to move the first weight along the handle between the first and second weight positions as the handle is rotated such that the first weight can provide a mechanical advantage during rotation of the handle from TDC to BDC due to gravity acting on the first weight, whereby rotation of the handle drives the generator thereby to generate electrical power.

2. The apparatus of claim 1, wherein the first linear actuator is arranged to move the first weight from the first weight position to the second weight position so that the first weight is in the second weight position when the handle is at TDC, and from the second weight position to the first weight position so that the first weight is in the first weight position when the handle is at BDC.

3. The apparatus of claim 1, wherein the first linear actuator is arranged such that movement of the first weight between the first and second weight positions begins before the handle reaches TDC and/or BDC.

4. The apparatus of claim 3, wherein movement of the first weight begins at least 1° before the handle reaches TDC and/or BDC.

5. The apparatus of claim 4, wherein movement of the first weight between the first and second weight positions begins approximately 10° before the handle reaches TDC and/or BDC.

6. The apparatus of claim 1, wherein the handle comprises an elongate rigid member.

7. The apparatus of claim 1, wherein the apparatus comprises a plurality of handles, each handle rotatably coupled to the generator.

8. The apparatus of claim 1, wherein the first linear actuator is configured such that the movement of the first weight between the first and second weight positions completes when the handle reaches TDC and/or BDC.

9. The apparatus of claim 1, wherein the swing arm is pivotally mounted to the apparatus, having a first end coupled to the handle and a second end coupled to a pulley system configured to cause the swing arm to pivot about a mount whereby to rotate the handle.

10. The apparatus of claim 1, wherein the swing arm is coupled to the handle via an elongate strut that engages with an elongate slot in the handle, the slot being located between the first end and second end of the handle, wherein, when engaged with an end of the elongate slot that is located towards the second end of the handle, the elongate strut acts to rotate the handle from BDC to TDC.

11. A power station comprising an apparatus according to claim 1.

12. The apparatus of claim 1, wherein the second weight is provided on a tiltable platform, said platform having a first end located towards the first end of the swing arm, and a second end located towards the second end of the swing arm, the platform being pivotally mounted to the apparatus at a pivot point positioned between the first end and second end of the platform, wherein said second weight is moveable along the platform between the first end and second end of the platform, wherein movement of the second weight past the pivot point causes the platform to tilt downward in the direction of said movement, said platform being coupled to the swing arm such that tilting movement of the platform assists tilting movement of the swing arm.

13. The apparatus of claim 1, wherein at least one of the first linear actuator and second linear actuator is a piston.

14. The apparatus of claim 1, wherein the handle is coupled to the generator via a gearbox.

15. The apparatus of claim 1, wherein the generator comprises a ring generator.

16. A method of generating electrical power using a generator with a handle and a swing arm coupled to the handle, the method comprising:
    during rotation of the handle of the generator from the a top dead centre (TDC) position to the a bottom dead centre (BDC) position, actuating a first linear actuator of the generator to move a first weight along the handle from a second weight position, in which the first weight is proximal to a second end of the handle, to a first weight position, in which the first weight is proximal to a first end of the handle, so that the first weight is at its the first weight position when the handle is at approximately BDC, and actuating the a second linear actuator of the generator to move a second weight to assist motion of the swing arm from the second weight position to the first weight position, the first end of the handle being rotatably coupled to the generator and the second end of the handle being rotatable 360 about the first end in a substantially vertical plane from the TDC position, through the BDC position, and back to the TDC position; and during rotation of the handle from the BDC position to the TDC position, actuating the first linear actuator to move the first weight along the handle from the first weight position to the second weight position, so that the first weight is at its the second weight position when the handle is at approximately TDC, and actuating the second linear actuator to move the second weight to assist motion of the swing arm from a first swing arm position to a second swing arm position;

wherein, when the first weight is in the second weight position, the first weight provides a mechanical advantage as the handle rotates from TDC to BDC due to gravity acting on the first weight, whereby rotation of the handle drives the generator thereby to generate electrical power.

17. A power station implementing a method according to claim 16.

\* \* \* \* \*